3,452,029
3-α-PHENYLBENZYLOXY - 8 - SUBSTITUTED NORTROPANES AND THEIR SUBSTITUENTS
Scott J. Childress, Philadelphia, and Stephen I. Sallay, Wynnewood, Pa., assignors to American Home Products Corporation, New York, N.Y., a corporation of Delaware
No Drawing. Filed Nov. 21, 1966, Ser. No. 595,601
Int. Cl. C07d 43/12; A61k 27/00
U.S. Cl. 260—292
10 Claims

ABSTRACT OF THE DISCLOSURE

The invention is directed to novel, nortropane derivatives and is particularly directed to a 3-α-phenylbenzyloxy-8-substituted nortropanes and their substituents. The compounds are useful as mydriatic agents, central nervous system depressants and anti-convulsant agents.

---

This invention relates to and has for its objects the provision of new physiologically active compounds, novel process for their production and new intermediates useful in the preparation thereof.

More particularly, this invention relates to compounds of the Formula I:

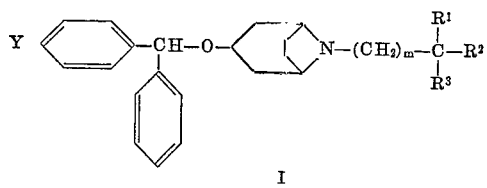

I and the pharmaceutically acceptable acid-addition salts thereof; wherein Y represents hydrogen, chloro, bromo or methoxy; $R^1$ represents hydrogen; $R^2$ represents hydrogen, hydroxy or acetoxy, or together $R^1$ and $R^2$ represent oxo (O=); $R^3$ represents hydrogen, phenyl, cycloalkyl having from 5 to 6 carbon atoms and alkoxy having less than 8 carbon atoms; $m$ is an integer from 1 to 5, with the proviso that $R^2$ is hydroxy or acetoxy only when $R^3$ is phenyl or cycloalkyl.

Among the suitable acid-addition salts include, inter alia, inorganic acids, such as the hydrohalic acids (e.g., hydrochloric and hydrobromic acid), sulphuric acid, nitric acid, boric acid and phosphoric acid, and organic acids such as oxalic, fumaric, tartaric, citric, acetic, succinic and maleic acid.

The novel compounds of this invention are pharmacologically active substances which are useful as mydriatic, central nervous system depressant and anti-convulsant agents.

The compounds of the present invention can be prepared and administered to mammals, i.e., humans and animals, in a wide variety of oral and parenteral dosage forms.

For preparing pharmaceutical compositions from the physicologically active compounds of this invention, pharmaceutically acceptable carriers can be either solid or liquid. Solid form preparations include powders, tablets, dispersible granules, capsules, cachets and suppositories. A solid carrier can be one or more substances which may also act as diluents, flavoring agents, solubilizers, lubricants, suspending agents, binders or tablet-disintegrating agents: it can also be an encapsulating material. In powders the carrier is a finely divided solid which is in admixture wth the finely divided compound. In the tablets the compound is mixed with carrier having the necessary binding properties in suitable proportions and compacted in the shape and size desired. The powders and tablets preferably contain from 5 or 10 to 99% of the active ingredient. Suitable solid carriers are magnesium carbonate, magnesium stearate, talc, sugar, lactose, pectin, dextrin, starch, gelatin, tragacanth, methyl cellulose, sodium carboxymethyl cellulose, a low melting wax and cocoa butter. The term "preparation" is intended to include the formulation of the compound with encapsulating material as carrier providing a capsule in which the compound (with or without other carriers) is surrounded by carrier, which is thus in association with it. Similarly, cachets are included. Tablets, powders, cachets and capsules can be used for oral administration.

Liquid form preparations include solutions, suspensions and emulsions. As an example may be mentioned water-propylene glycol solutions for parenteral injection. Liquid preparations can also be formulated in solution in aqueous polyethylene glycol solutions. Aqueous suspensions suitable for oral use can be made by dispensing the finely divided compound in water with viscous material, natural or synthetic gums, resins, etc., for example, gum arabic, ion-exchange resins, methyl cellulose, sodium carboxymethyl cellulose and other well known suspending agents.

Preferably, the pharmaceutical preparation is in unit dosage form. In such form, the preparation is sub-divided in unit doses containing appropriate quantities of the compound: the unit dosage form can be a packaged preparation, the package containing discrete quantities of preparation, for example, packeted powders of vials or ampules.

The unit dosage form can be a capsule, cachet or tablet itself or it can be the appropriate number of any of those in packaged form. The quantity of compound in a unit dose of preparation may be varied or adjusted from a 1 mg. of 100 mg. according to the particular application and the potency of the active ingredient.

In therapeutic use, the preparations are administered at the initial dosage of about 5 mg. to 25 mg. daily. The dosages, however, may be varied depending upon the requirements of the patient.

In accordance with one feature of this invention, the compounds of this invention may be prepared as illustrated in the following reaction scheme, wherein Y, R³ and m are as hereinbefore defined:

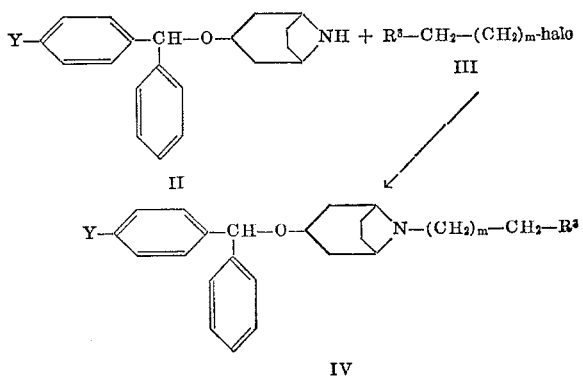

In the above reaction, compounds of Formula II are treated with alkylating agents of the Formula III, in the conventional manner, preferably in an inert organic solvent in the presence of a base to yield, inter alia, the final products of Formula IV. The starting compounds of Formula II may be prepared by methods known in the art, such as described in British Patent No. 824,875.

In accordance with another feature of this invention, the final products of this invention having an oxo substituent, may be prepared by reacting a compound of Formula II with a quaternary ammonium compound of the formula:

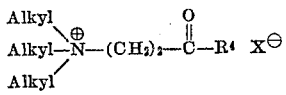

wherein X is a halide; and R⁴ is phenyl or cycloalkyl having 5 to 6 carbon atoms, in an inert organic solvent, preferably in the presence of an acid acceptor, to yield compounds of the formula:

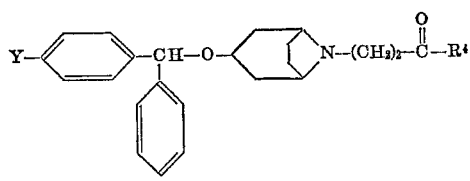

which are also final products of this invention.

Alternatively, the compounds of Formula VI may be prepared by reacting the compounds of Formula II with a compound of the formula: R³—CO—(CH₂)ₘ—halo, such as ω-halo carboxylic acid esters β-halo-propiophenone, and the like, wherein R³ is phenyl, cycloalkyl or alkoxy; and m is as hereinbefore defined, in an inert organic solvent at a temperature between 50° and 150° C. preferably in the presence of an acid acceptor.

Additionally, the oxo substituent may be reduced to form the corresponding hydroxylated compound, such as by treatment with sodium borohydride in an inert solvent.

The following examples illustrate the invention (all temperatures being in centigrade):

EXAMPLE 1

3-[3-(p-chloro-α-phenylbenzyloxy)-8-nortropanyl]-propiophenone oxalate 3-(p-chloro - α - phenylbenzyloxy)-nortropane (0.02 mole) and β-trimethylaminopropiophenone-iodide (0.024 mole) are dissolved in 50 ml. of dimethylformamide and treated with 2.6 gm. of sodium carbonate. The reaction mixture is stirred for 16 hours at room temperature and then diluted with water. A gum separates that is extracted with ether. The ether portion is dried and treated with oxalic acid dissolved in ethanol to yield 3-[3-(p-chloro-α-phenylbenzyloxy)-8-nortropanyl]-propiophenone oxalate having a melting point of 100–102° (dec.).

Similarly, by following the procedure of Example 1, but substituting another organic acid or an inorganic acid there is obtained the corresponding acid-addition salt.

EXAMPLE 2

3-[3-(α-phenylbenzyloxy)-8-nortropanyl]propiophenone oxalate

Following the procedure of Example 1, but substituting 3-(α - phenylbenzyloxy)-nortropane for 3-(p-chloro-α-phenylbenzyloxy)-8-nortropane there is obtained 3-[3-(α-phenylbenzyloxy)-8-nortropanyl]-propiophenone oxalate.

EXAMPLE 3

3-[3-(p-bromo-α-phenylbenzyloxy)-8-nortropanyl]-propiophenone oxalate

Following the procedure of Example 1, but substituting 3-(p-bromo - α - phenylbenzyloxy)-nortropane for 3-(p-chloro-α-phenylbenzyloxy)-8-nortropane there is obtained 3-[3-(p-bromo-α-phenylbenzyloxy)-8-nortropanyl] - propiophenone oxalate.

EXAMPLE 4

3-[3-(p-methoxy-α-phenylbenzyloxy)-8-nortropanyl]-propiophenone oxalate

Following the procedure of Example 1, but substituting 3-(p-methoxy - α - phenylbenzyloxy)-nortropane for 3-(p-chloro-α-phenylbenzyloxy)-8-notropane there is obtained 3-[3-(p-methoxy-α-phenylbenzyloxy) - 8 - nortropanyl]-propiophenone oxalate.

EXAMPLE 5

3-(p-chloro-α-phenylbenzyloxy)-α-cyclohexyl-8-tropane ethyl ketone oxalate

Following the procedure of Example 1, but substituting β-trimethylaminoethyl cyclohexyl ketone for β-trimethylamino-propiophenone there is obtained 3-(p-chloro-α-phenylbenzyloxy)-α-cyclohexyl-8-tropane ethyl ketone oxalate.

EXAMPLE 6

3-(p-chloro-α-phenylbenzyloxy)-α-cyclopentyl-8-tropane ethyl ketone oxalate

Following the procedure of Example 1 but substituting β-trimethylaminoethyl cyclopentyl ketone for β-trimethylaminopropiophenone there is obtained 3-(p--chloro-α-phenylbenzyloxy)-α-cyclopentyl-8-tropane ethyl ketone oxalate.

EXAMPLE 7

3-(p-chloro-α-phenylbenzyloxy)-8-phenethylnortropane oxalate 3-(p-chloro - α - phenylbenzyloxy)-nortropane (0.02 mole), phenylethyl bromide (0.01 mole) and 0.1 gm. of sodium iodide are dissolved in 100 ml. of n-butanol and refluxed for 24 hours. The solvent is removed by evaporation in vacuo and the residue is extracted with petroleum ether to remove unreacted phenylethyl bromide. The residue is then extracted with warm ether, dried and then treated with oxalic acid dissolved in ethanol to yield 3-(p-chloro-α-phenylbenzyloxy)-8 - phenethylnortropane oxalate which, upon recrystallization from ethyl acetate, melted at 159–160°.

Similarly, by following the procedure of Example 7, but substituting succinic acid for oxalic acid there is obtained 3 - (p-chloro-α-phenylbenzyloxy)-8-phenethyl-nortropane succinate.

EXAMPLE 8

3-(p-chloro-α-phenylbenzyloxy)-8-ethylnortropane oxalate

Following the procedure of Example 7, but substituting ethyl bromide for phenylethyl bromide there is obtained 3-(p-chloro-α-phenylbenzyloxy)-8 - ethylnortropane oxalate.

EXAMPLE 9

3-(p-chloro-α-phenylbenzyloxy)-8-cyclohexyl ethylnortropane oxalate

Following the procedure of Example 7, but substituting cyclohexyl ethyl bromide for phenylethyl bromide there is obtained 3-(p-chloro-α-phenylbenzyloxy)-8-cyclohexyl ethylnortropane oxalate.

EXAMPLE 10

3-(p-chloro-α-phenylbenzyloxy)-8-butyl nortropane oxalate

Following the procedure of Example 7, but substituting butyl bromide for phenylethyl bromide there is obtained 3-(p-chloro-α-phenylbenzyloxy)-8-butyl nortropane oxalate.

EXAMPLE 11

3-(p-chloro-α phenylbenzyloxy)-8-(4-methoxybutyl) nortropane

Following the procedure of Example 7, but substituting methoxy butyl bromide for phenethyl bromide there is obtained 3-(p - chloro-α-phenylbenzyloxy)-8-methoxybutyl) nortropane having a melting point of 72–73°.

EXAMPLE 12

3-(p-chloro-α-phenylbenzyloxy)-8-(4-butoxybutyl) nortropane

Following the procedure of Example 7, but substituting butoxybutyl bromide for phenethyl bromide there is obtained - 3 - (p-chloro-α-phenylbenzyloxy)-8-(4-butoxybutyl) nortropane.

EXAMPLE 13

3-(p-chloro-α-phenylbenzyloxy)-8-(4-ethoxypropyl) nortropane

Following the procedure of Example 7, but substituting ethoxypropyl bromide for phenethyl bromide there is obtained 3-(p - chloro-α-phenylbenzyloxy)-8-(4-ethoxypropyl) nortropane.

EXAMPLE 14

3-(p-chloro-α-phenylbenzyloxy)-8-(4-methoxypentyl) nortropane

Following the procedure of Example 7 but substituting methoxypentyl bromide for phenethyl bromide there is obtained 3-(p-chloro - α - phenylbenzyloxy)-8-(4-methoxypentyl) nortropane.

EXAMPLE 15

3-(p-chloro-α-phenylbenzyloxy)-8-(4-methoxypropyl) nortropane

Following the procedure of Example 7 but substituting methoxypropyl bromide for phenethyl bromide there is obtained 3 - (p-chloro-α-phenylbenzyloxy)-8-(4-methoxypropyl) nortropane.

EXAMPLE 16

3-(p-chloro-α-phenylbenzyloxy)-α-phenyl-8-nortropanepropanol oxalate

3-[3-(p-chloro-α-phenylbenzyloxy)-8-nortropanyl] propiophenone is dissolved in methanol and treated with sodium borohydride at room temperature for 16 hours. The mixture is filtered and the solvent evaporated. The residue is then dissolved in ether, washed with water and dried. The ethereal solution is treated with oxalic acid dissolved in isopropanol to yield 3-(p-chloro-α-phenylbenzyloxy)-α-phenyl-8-nortropanepropanol oxalate having a melting point of 86–86.5° (dec.).

EXAMPLE 17

3-(α-phenylbenzyloxy)-α-phenyl-8-nortropanepropanol oxalate

Following the procedure of Example 16 but substituting 3-[3-(α-phenylbenzyloxy)-8-nortropanyl] propiophenone for 3-[3-(p-chloro-α-phenylbenzyloxy)-8 - nortropanyl] propiophenone there is obtained 3-(α-phenylbenzyloxy)-α-phenyl-8-nortropanepropanol oxalate.

It is understood that the free base of any of the salts of Examples 1 through 17 may be obtained by any conventional means.

The invention may be variously otherwise embodied within the scope of the appended claims.

What is claimed is:
1. A compound selected from the group consisting of those of the formula

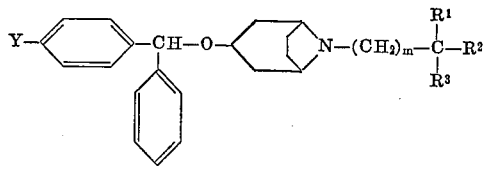

and the pharmaceutically acceptable acid-addition salts thereof; wherein Y is selected from the group consisting of hydrogen, chloro, bromo and methoxy; $R^1$ is hydrogen; $R^2$ is selected from the group consisting of hydrogen, hydroxy and acetoxy; and together $R^1$ and $R^2$ is oxo (=O); $R^3$ is selected from the group consisting of hydrogen, phenyl, cycloalkyl having from 5 to 6 carbon atoms and alkoxy having 1 to 4 carbon atoms; and $m$ is an integer from 1 to 5, with the proviso that $R^2$ is selected from the group consisting of hydroxy and acetoxy only when $R^3$ is selected from the group consisting of phenyl and cycloalkyl.

2. A compound according to claim 1 which is a pharmaceutically acceptable acid addition salt of a compound having the structural formula:

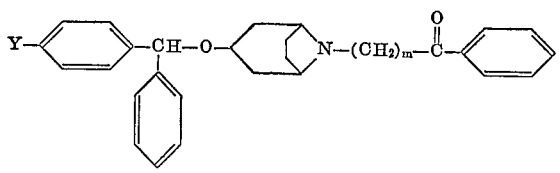

wherein $m$ is an integer from 1 to 5 and Y is selected from the group consisting of hydrogen, chloro, bromo and methoxy.

3. A compound according to claim 2 that is a pharmaceutically acceptable acid addition salt of 3-[3-(p-chloro-α-phenylbenzyloxy)-8-nortropanyl]propiophenone.

4. A compound according to claim 1 which is a pharmaceutically acceptable acid addition salt of a compound having the structural formula:

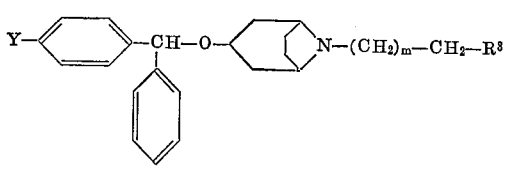

wherein $m$ is an integer from 1 to 5, $R^3$ is selectde from the group consisting of hydrogen, phenyl, cycolalkyl having from 5 to 6 carbon atoms and alkoxy having 1 to 4 carbon atoms and Y is selected from the group consisting of hydrogen, chloro, bromo and methoxy.

5. A compound according to claim 4 that is a pharmaceutically acceptable acid-addition salt of 3-(p-chloro-α-phenylbenzyloxy)-8-phenethyl)-nortropane.

6. A compound according to claim 4 that is a pharmaceutically acceptable acid-addition salt of 3-(p-chloro-α-phenylbenzyloxy)-8-(4-methoxybutyl)nortropane.

7. A compound according to claim 1 which is a pharmaceutically acceptable acid addition salt of a compound having the structural formula:

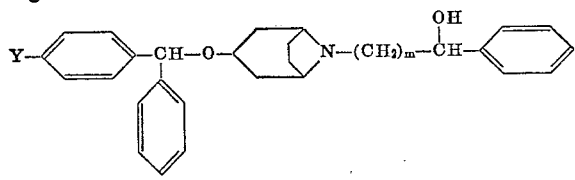

wherein Y is selected from the group consisting of hydrogen, chloro, bromo and methoxy and $m$ is an integer from 1 to 5.

8. A compound according to claim 7 that is a pharmaceutically acceptable acid-addition salt of 3-(p-chloro-α-phenylbenzyloxy)-α-phenyl-8-nortropanepropanol.

9. A compound according to claim 1 that is a pharmaceutically acceptable acid-addition salt of 3-(p-chloro-α-phenylbenzyloxy)-α-cyclohexyl-8-tropane ethyl ketone.

10. A compound according to claim 1 that is a pharmaceutically accepable acid-addition salt of 3-(p-chloro-α-phenylbenzyloxy)-α-cyclopentyl-8-tropane ethyl ketone.

References Cited
UNITED STATES PATENTS 3,032,556   5/1962   Juncker et al. _____ 260—292

HENRY R. JILES, *Primary Examiner.*

A. L. ROTMAN, *Assistant Examiner.*

U.S. Cl. X.R.

424—265